United States Patent
Wu

(10) Patent No.: US 7,173,832 B2
(45) Date of Patent: Feb. 6, 2007

(54) MULTIFUNCTION POWER CONVERTOR

(76) Inventor: Jialin Wu, 3# Unit 3 No. 5 Kehua Alley Wuhou District, Sichuan Province, Chengdu 610000 (CN)

(*) Notice: Subject to any disclaimer, the term of this patent is extended or adjusted under 35 U.S.C. 154(b) by 0 days.

(21) Appl. No.: 10/511,574

(22) PCT Filed: Apr. 8, 2003

(86) PCT No.: PCT/CN03/00250

§ 371 (c)(1),
(2), (4) Date: Apr. 12, 2005

(87) PCT Pub. No.: WO03/088468

PCT Pub. Date: Oct. 23, 2003

(65) Prior Publication Data

US 2005/0174812 A1    Aug. 11, 2005

(30) Foreign Application Priority Data

Apr. 15, 2002 (CN) ............................. 02 1 13612
Apr. 15, 2002 (CN) ............................. 02 2 22245

(51) Int. Cl.
*H02M 1/12* (2006.01)

(52) U.S. Cl. .................. 363/40; 363/35; 363/37

(58) Field of Classification Search ................ 363/34, 363/35, 37, 39, 40; 318/815; 361/814
See application file for complete search history.

(56) References Cited

U.S. PATENT DOCUMENTS

| | | | |
|---|---|---|---|
| 3,512,045 A * | 5/1970 | Sanger et al. ............... 361/44 |
| 4,806,896 A * | 2/1989 | Shikano et al. .............. 336/73 |
| 5,321,373 A * | 6/1994 | Shusterman et al. ......... 333/12 |
| 5,563,776 A | 10/1996 | Eck | |
| 5,850,114 A * | 12/1998 | Froidevaux ................. 307/105 |
| 5,905,642 A * | 5/1999 | Hammond .................. 363/37 |
| 6,281,777 B1 * | 8/2001 | Aufleger et al. ............ 336/175 |
| 6,288,915 B1 * | 9/2001 | Stemmler et al. ............ 363/34 |

FOREIGN PATENT DOCUMENTS

| | | |
|---|---|---|
| CN | 1035743 A | 9/1989 |
| CN | 2444341 Y | 8/2001 |
| WO | WO00/51228 | 8/2000 |

OTHER PUBLICATIONS

Dai Qiang, Several Good Project on Middle-voltage-motor's Variable Speed-inverter, ChNT, 1st Issue 2002, (pp. 53-55).

* cited by examiner

*Primary Examiner*—Gary L Laxton
(74) *Attorney, Agent, or Firm*—Jenkens & Gilchrist, P.C.

(57) ABSTRACT

The present invention relates to a multifunction power convertor in the field of power transmission. The multifunction power convertor consists of a rectifier circuit, a filter circuit connecting with the rectifier circuit, an inverter circuit connecting with the filter circuit, and differential mode voltage suppression reactors ($LS_1$, $LS_2$, $LS_3$) and filter capacitor group that connect in series with the output lines (U, V, W) of the inverter circuit respectively. The characteristic of the present invention is that a closed magnetic ring is provided on the output lines (U, V, W) between the differential mode voltage suppression reactors and the filter capacitor group, and the output lines (U, V, W) wind in parallel on the closed magnetic ring. The merit of this invention is using the closed magnetic ring to insulate the high frequency signal, thus reducing the output of common mode voltage and improving the voltage output waveform; besides, the structure is very simple, with the cost and the volume and weight being reduced greatly.

2 Claims, 2 Drawing Sheets

MULTIFUNCTION POWER CONVERTOR

TECHNICAL FIELD

The present invention relates to a power transmission device in the field of power transmission, and specifically, to a multifunction power convertor.

BACKGROUND ART

Electricity energy is widely used on all kinds of occasions. Along with the development of science and technology, people are developing varied power transmission devices to make reasonable use of the electricity energy of power network and meet the demands of different power facilities such as the transformer that changes the voltage, the inverter that implements AC/DC conversion, the transducer that changes the output frequency, various active VAR compensators that keep the electrical source of power network from being polluted, and energy feedback devices. The common drawbacks of these power transmission devices are that their functions are single and the performance could not really achieve an ideal functional mode. For example, the contradiction between the transformation capacity of the transformer and the high temperature insulation and cost of consumables per se; the contradiction between the high voltage transfer of the inverter and the low voltage power switch per se; and the damage brought to the electric machine by the common mode voltage generated during operation wider high frequency as well as the pollution resulted from being transferred to the electrical source of power network. To rectify these defects in performance, the current practice is to adopt corresponding measures to overcome the shortcomings appeared in use, e.g. the above-mentioned inverter, which is mainly formed of rectification portion, filter portion and inversion portion. This type of inverter generates two types of signals, i.e. high frequency and low frequency, during operation. Its voltage waveform is pulse width modulated (PWM) wave, being seriously distorted with a high content of harmonic wave. The high frequency signal generated during operation would form a common mode voltage to enter the electric machine, causing the electric machine to generate heat, resulting in heavy loss, low efficiency and loud noise, thus bringing great damage to the electric machine. Besides, the common mode voltage could be transferred through the ground to the electrical source of power network and cause pollution. To handle said drawbacks caused by the common mode voltage, the current practice is to adopt a transformer to suppress and insulate the common mode voltage, and during the insulation, the voltage imposed on the inversion portion is also reduced, thus ensuring the normal operation of the power switch with low withstand voltage that forms the inversion portion (see Preferred Solutions to Frequency Control of Motor Speed of Medium Voltage Machine released in *Electric Transmission*, 1st issue, 2002, published by Tianjin Electric Transmission Design Research Institute). The demerit of this measure is the huge bulk of the inverter with heavy weight and high cost, and it could only be used as inverter.

CONTENTS OF THE INVENTION

The object of the present invention is to rectify said defects of the prior art, providing a multifunction power convertor with simple structure and superior performance that could not only supply high grade electricity energy needed by power facilities like electric machine, but also serve as a protector of the electrical source of power network that protects the electrical source of power network from being polluted.

The object of the present invention is achieved by the technical solution of suppressing the output of the common mode voltage and reducing the pulse width modulated wave to sine wave voltage output. The multifunction power convertor consists of a rectifier circuit, a filter circuit connecting with the rectifier circuit, an inverter circuit connecting with the filter circuit, and differential mode voltage suppression reactors $LS_1$, $LS_2$, $LS_3$ that connect in series with the output lines U, V, W of the inverter circuit respectively, and filter capacitor group. Said filter capacitor group consists of capacitors $C_3$, $C_4$, $C_5$ that respectively connect in series with the output lines U, V, W, while the other ends of capacitors $C_3$, $C_4$, $C_5$ together form a center point N. The characteristic of the present invention is that a closed magnetic ring is provided on the output lines U, V, W of the inverter circuit between the differential mode voltage suppression reactors and the filter capacitor group, and the closed magnetic ring is arranged in such way that the output lines U, V, W wind in parallel on the closed magnetic ring. It has been found that said closed magnetic ring has a tremendous blocking function against the high frequency signal, so the high frequency current flowing over the various power switches in the reactors and inverter circuits greatly falls, thus suppressing the output of the common mode voltage radically and ensuring the normal operation of the inductor, which will not overheat, and the various power switches, which will not become overvoltage. Utilizing the inductor's function of energy storage and the effect of the filter capacitor group's low impedance to the high frequency component that short-circuits the high frequency component, the present invention makes the output voltage waveform form a complete sine waveform, thus improving the working condition of the electric machine and avoiding the pollution caused by the common mode voltage transferring to the power network. If the output lines W, U, V of the inverter circuit are connected with the electrical source of power network at this moment, the electricity energy converter could then be used as "active VAR compensator", "energy feedback device", "PWM rectifier" and "active filter" to achieve multifunction.

On the basis of above structure, the center point N of filter capacitor group connects with the center point A of the DC source of rectifier filter circuit and they join together the ground. As the capacitive impedance of a capacitor is far less than that of the drain capacitance of an electric machine, the zero-sequence current path can be connected to the center point A of the DC source of filter circuit so as to be bypass absorbed by the capacitor in the filter circuit, thus avoiding the phenomenon of double-voltage rectification. This structure is particularly suitable for various kinds of AC machine.

Compared with the aforementioned products of the same kind, the advantage of the present invention is using the closed magnetic ring to insulate the high frequency signal, thus reducing the output of the common mode voltage and improving the voltage output waveform. This could not only further improve the working condition and prolong the service life of the electric machine, but also be widely applied to all kinds of electrical equipment that needs to work at standard sine wave voltage waveform, e.g. marine power source, electric vehicle power source, and etc. From structural angle, it omits the transformer, thus simplifying the structure and reducing the cost, volume and weight to a large extent.

Following is a further explanation of the present invention through the combination of figures and embodiments, but

MODE OF CARRYING OUT THE INVENTION

Figure 1:
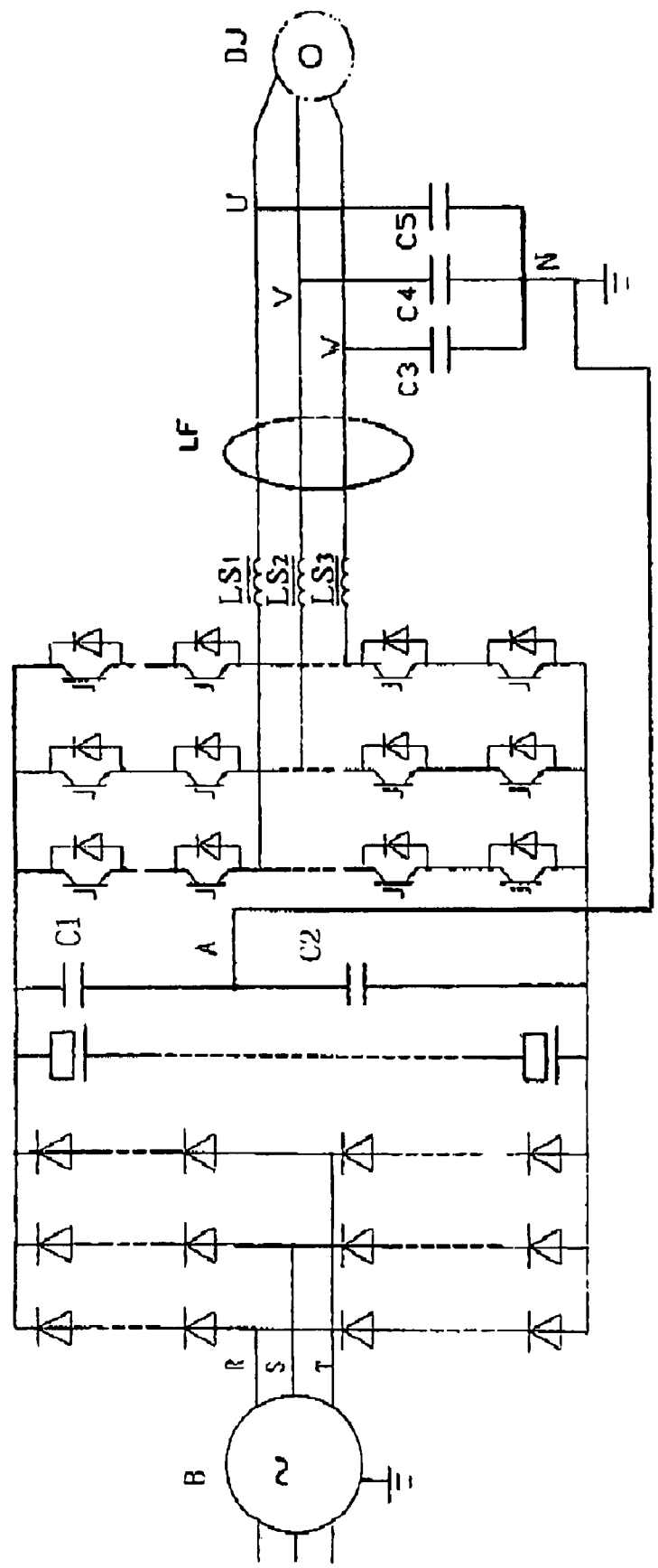
FIG. 1 is a circuit structure diagram of the present embodiment.
Figure 2:
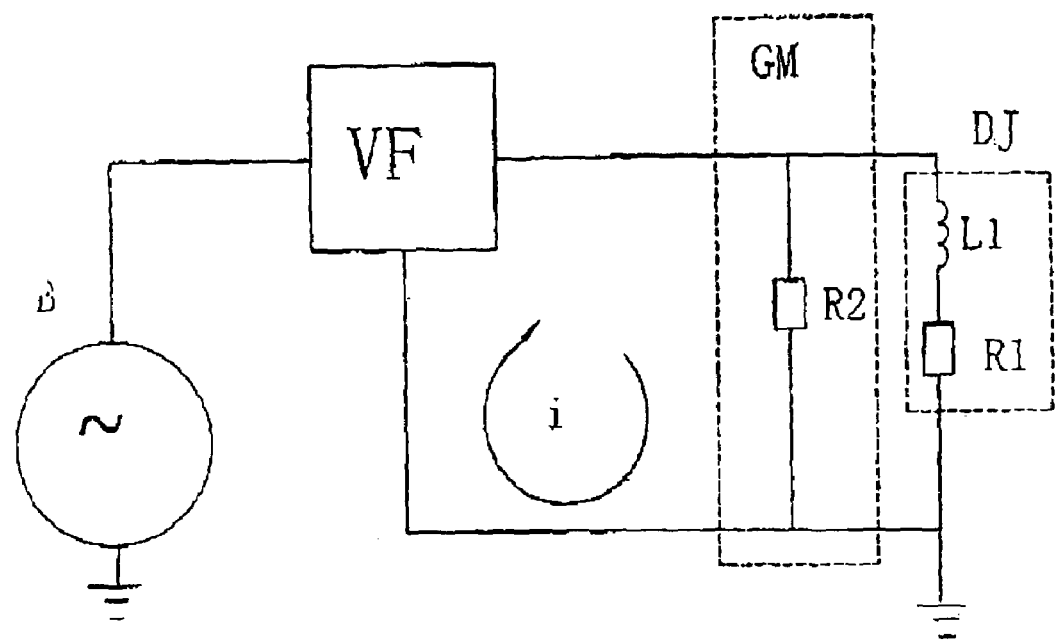
FIG. 2 is an equivalent circuit schematic diagram of the present invention.
Figure 3:
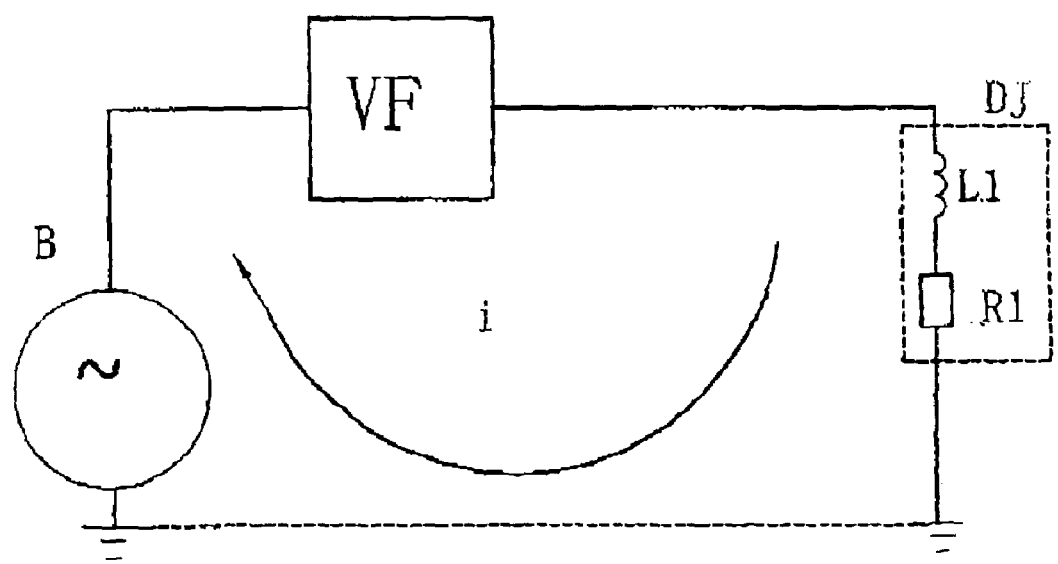
FIG. 3 is an equivalent circuit schematic diagram of the existing inverter power source.

As illustrated in FIG. 1, the present multifunction power convertor consists of a rectifier circuit, a filter circuit connecting with the rectifier circuit, an inverter circuit connecting with the filter circuit, the differential mode voltage suppression reactors $LS_1, LS_2, LS_3$ and filter capacitor group that connect in series with the output lines U, V, W of the inverter circuit respectively. Said filter capacitor group consists of capacitors $C_3, C_4, C_5$ that connect in series with the output lines U, V, W), while the other ends of capacitors $C_3, C_4, C_5$ connect in parallel and form a center point N. A closed magnetic ring LF is provided on the output lines U, A, W of the inverter circuit between the differential mode voltage suppression reactors $LS_1, LS_2, LS_3$ and the filter capacitors $C_3, C_4, C_5$, and the output lines U, V, W wind in parallel on the closed magnetic ring, namely, winding the three output lines U, V, W together and then winding them on the closed magnetic ring. The composing of the rectifier circuit, filter circuit, inverter circuit, reactors LS and filter capacitor group that form the present multifunction power convertor as well as the structural relationship between the various components could all follow the structural form of the transducer manufactured by Chengdu Jialing Electric Manufacture Corporation, which is located in Sichuan Province, China. The center point N of filter capacitors $C_3, C_4, C_5$ and the center point A of the DC source of filter circuit respectively connecting with the ground could achieve the same effect. This way of connection is actually of the same structure. FIG. 2 is an equivalent circuit schematic diagram of the present invention, wherein $R_2$ is the equivalent resistance of the circuit between point N and point A, $R_1$ is the equivalent impedance of electric machine DJ, i is a common mode current, $R_2$ connects the ground. Since $R_2 << R_1$, it could be deemed that said common mode current i is short-circuited and does not flow into the electric machine coil, thus achieving the object of canceling or suppressing common mode voltage. In other words, the capacitive impedance of capacitors $C_3, C_4, C_5$ is far less than the electric machine coil's equivalent impedance to the ground, so the common mode current directly feeds back through capacitors $C_3, C_4, C_5$ to the DC bus bar of the transducer and will not enter the electric machine coil. The common mode impact current i (see FIG. 3) caused by the common mode voltage of the existing inverter power source flows through the equivalent resistance $R_1$ and equivalent inductance $L_1$ of the electric machine coil to the ground wire, from where it returns to the ground wire of input electrical source B and then returns to inverter power source VF.

The invention claimed is:

1. A multifunction power convertor, comprising:
   a rectifier circuit;
   a filter circuit connecting with the rectifier circuit;
   an inverter circuit connecting with the filter circuit;
   differential mode voltage suppression reactors ($LS_1, LS_2, LS_3$) which connect in series with output lines (U, V, W) of the inverter circuit respectively;
   a filter capacitor group, said filter capacitor group comprising a plurality of capacitors ($C_3, C_4, C_5$), one ends of which connect in series with the output lines (U, V, W);
   wherein other ends of said plurality of capacitors ($C_3, C_4, C_5$) connect in parallel and form a center point (N);
   wherein a closed magnetic ring is provided on the output lines (U, V, W) of the inverter circuit between the differential mode voltage suppression reactors and the filter capacitor group; and
   wherein the closed magnetic ring is arranged in such way that the output lines U, V, W) wind in parallel on the closed magnetic ring.

2. The multifunction power convertor of claim 1 wherein the center point (N) of the filter capacitor group connects with a center point (A) of a DC source of the rectifier circuit and together join ground.

* * * * *